Patented Mar. 21, 1933

1,902,255

UNITED STATES PATENT OFFICE

WILLIAM HENRY MOSS AND BLANCHE B. WHITE, OF CUMBERLAND, MARYLAND, ASSIGNORS TO CELANESE CORPORATION OF AMERICA, OF NEW YORK, N. Y., A CORPORATION OF DELAWARE

COATING COMPOSITION AND FILM PRODUCED THEREBY

No Drawing.   Application filed March 3, 1928. Serial No. 258,999.

This invention relates to coating compositions containing derivatives of cellulose and particularly to a new and improved synthetic resin for use in the same, prepared from aniline and furfural.

An object of our invention is to provide a coating composition containing derivatives of cellulose and particularly organic substitution derivatives of cellulose that produces clear, homogeneous, hard, tough films.

A further object of our invention is to provide a suitable resin for lacquers containing organic substitution products of cellulose such as cellulose acetate, which resin is compatible with the other constituents of the lacquers and which produces clear solutions which, upon drying, form films that are adherent, tough, hard and water repellent.

The preparation of a lacquer containing organic derivatives of cellulose such as cellulose acetate as the main constituent of the lacquer base, which lacquer is to be applied to a hard, smooth surface, presents many difficulties. This is due primarily to the fact that films from lacquers containing cellulose acetate as the sole constituent of the lacquer base do not adhere to smooth surfaces. When attempts are made to incorporate natural gums or resins in the lacquer containing cellulose acetate in order to impart the necessary adhesive qualities to the films produced from it, both the lacquer and the films produced become cloudy and unhomogeneous.

We have found that the synthetic resins produced from aniline and furfural are compatible with cellulose acetate and that when added to lacquers containing cellulose acetate, they form clear solutions that, upon drying, produce clear, hard, tough and firmly adherent films, which in the undyed or unpigmented form, are brown in color.
The selection of a suitable resin for a lacquer containing the organic derivatives of cellulose presents a difficult problem because the resin must be compatible with the organic derivative such as cellulose acetate, both in solution and in the dry films and also with softeners, pigments, dyes which may be added to produce desired effects and variations of the films. In general, a synthetic resin for this purpose should be easily prepared from preferably cheap materials, it should be easily freed from any catalysts, whether acid or alkaline, used in its preparation, it should of itself be practically neutral and should be strongly resistant to rials. It should be hard and solid at ordiwater and free from water soluble matenary temperatures and its solutions from volatile solvents should dry quickly and completely when applied as a film without a long continued retention of low boiling point solvents such as sometimes occurs with phenol formaldehyde resins.

We have found that the resins prepared from aniline and furfural in the absence of catalysts can be used as above stated in cellulose derivative lacquers. However, aniline-furfural resins prepared in the presence of either acid or alkaline catalysts may also be used.

In accordance with our invention, we prepare a synthetic resin formed by the condensation of furfural with an aromatic amine. This synthetic resin is then used for making a lacquer which contains one or more derivatives of cellulose and a volatile solvent. The lacquer may also contain one or more natural or semi-synthetic resins or gums, one or more plastifiers or softening agents, medium and/or high boiling solvents, and preferably, but not necessarily, some pigments and/or dyes.

The synthetic resin of the aniline-furfural type may be prepared in the presence of either acid or alkaline catalysts, but we have found that the condensation of aniline and furfural proceeds with sufficient rapidity in the absence of any catalyst and we prefer, therefore, to use no catalyst. Although we prefer to use aniline as the aromatic amine to prepare the resin, other aromatic amines such as toluidine, xylidine, naphthylamine or substituted amines, such as nitraniline, may be used.

The cellulose derivative may be an inorganic ester such as cellulose nitrate, but we prefer to use organic derivatives of cellulose such as organic esters of cellulose and cellulose ethers. Examples of organic esters of cellulose are cellulose acetate, cellulose formate, cellulose propionate and cellulose butyrate. Examples of cellulose ethers are methyl cellulose, ethyl cellulose and benzyl cellulose. By the term organic derivative of cellulose employed in the claims, we mean a cellulose ether or an organic acid derivative of cellulose.

The natural gums or resins or semi-synthetic resins that may be used in the lacquer are many. Of the natural gums or resins that may be used the following may be mentioned: manila, accaroides, pontianak, kauri, dammar, rosin or shellac. An example of semi-synthetic resin is ester gum, which is the glycerol ester of rosin.

Of the plastifiers or softeners that may be used the following are given by way of example: diethyl phthalate, tricresyl phosphate, triphenyl phosphate, amides, such as mono methyl toluene sulfonamide, triacetin, diphenylol propane, thiocarbanilid, etc.

Examples of medium and/or high boiling solvents are ethyl acetate, ethyl lactate, tetrachlorethane, benzyl alcohol or diacetone alcohol. Obviously other suitable mediums or high boiling solvents may be used.

The low boiling solvents may be any one of a mixture of two or more of any of the following liquids: acetone, alcohol (ethyl or methyl) benzene or ethylene dichloride.

The pigments or dyes used may be any of the pigments or dyes ordinarily used in the paint or lacquer industry that are suitable for the purpose.

In the preparation of the synthetic resin, furfural and aniline in equimolecular proportions are heated under reflux from one to three hours at about 170° C. A dark brown reaction product is rapidly formed and on cooling, after the above heating, a resin which is black, shiny, hard and brittle at 25° C. is obtained.

It may be distilled at ordinary pressure or steam distilled to remove any uncombined reactants though, in general, this would not be necessary.

The resin thus obtained is soluble in acetone, benzene, etc., and a film from these solutions rapidly dries to a hard, black, shiny surface at ordinary temperatures. The solution in acetone is miscible with solutions of cellulose acetate or cellulose organic derivatives in the usual solvents, and the lacquers thus produced give, on application to wood, metal, etc., clear brown films, the color varying with the proportions of cellulose acetate and resin used and with the constituents which may also be added.

The resin may be dissolved alone in any suitable solvent or mixture of solvents, and the solution thus produced may be added to a solution of cellulose derivative in the same or other solvents and plasticizers, dyes, pigments, stabilizers, or the resin and the cellulose derivatives may be dissolved together in the desired solvents or mixture of solvents or mixture of substances which are themselves nonsolvents for cellulose acetate and resin but which become solvents when mixed together, and dyes, pigments, and plasticizers, may be added as desired, at any stage in the above proceedings.

Further, we have found that the above resin is especially desirable for admixture with other synthetic resins and natural resins, the said mixtures of resins being also compatible with cellulose acetate in solutions, lacquers, plastic masses and films. Thus the aniline-furfural resin may be mixed with a phenol formaldehyde type resin, and preferably with a phenol-formaldehyde resin prepared in the presence of an acid catalyst, in any proportion, the mixture being, as stated, compatible with cellulose acetate in solutions, lacquers, plastic masses and films. These mixtures are especially useful where a light fast resin is desired, for, whereas the phenol formaldehyde type of resin generally darkens on exposure to sunlight or ultra-violet light, the films of aniline-furfural resins, gradually become lighter in color. Thus mixtures of the two types of resins, the exact proportions of which will vary with different specimens of resins, according to the method of preparations of the said resins, can be made, which mixtures are substantially light fast, the phenol-formaldehyde portions of which were not light fast.

Thus also the aniline-furfural resin may be mixed with natural resins such as kauri, pontianak, manila, dammar, rosin and semi-artificial resins such as ester gum, all of which mixtures are compatible with cellulose acetate in solutions, lacquers, films, plastic masses, although the said natural resins and ester gum are not of themselves compatible with cellulose acetate.

These admixtures of natural and synthetic resins with the aniline-furfural resin may be made in any way. They may be mixed, fused or ground together, dissolved together in suitable solvents or dissolved separately and their solutions mixed together or the said solutions mixed with cellulose acetate solutions to form lacquers, and dyes, pigments, softeners, etc., may be added as desired.

The following examples are given as illustrations of lacquers, but it is to be understood that the proportions and the constituents may be widely varied, as is well known to one skilled in the art:

Example I

| | Parts |
|---|---|
| Cellulose acetate | 10 |
| Aniline furfural synthetic resin | 10 | are dissolved in 100 parts of a solvent. This solvent may be acetone alone or it may be a mixture made as follows:

| | Parts |
|---|---|
| Acetone | 50 |
| Benzene | 25 |
| Alcohol (ethyl or denatured) | 25 |

If desired 20 parts of ethyl lactate may be added to either of the above lacquers. Instead of using 10 parts of aniline furfural resin 30 parts of the same may be used in the above described lacquer.

Example II

A coating composition may be made of the following composition:

| | Parts |
|---|---|
| Cellulose acetate | 20 |
| Aniline furfural synthetic resin | 5 |
| Acetone | 50 |
| Ethyl acetate | 20 |
| Benzene | 30 |
| Benzene alcohol | 5 |

Example III

A lacquer may be made up as follows:

| | Parts |
|---|---|
| Cellulose acetate | 7 |
| Aniline furfural synthetic resin | 7 |
| Diethyl phthalate | 4 |
| Tricresyl phosphate | 2 |
| Acetone | 50 |
| Alcohol | 25 |
| Benzene | 25 |
| Toluene | 10 |
| Ethyl lactate | 15 |

To this lacquer may be added 5 to 10 parts of pigment and/or 1 to 2 parts of dye.

Example IV

A coating composition that produces light fast films is made up as follows:

| | Parts |
|---|---|
| Cellulose acetate | 10 |
| Aniline furfural resin | 5 |
| Phenol formaldehyde resin | 5 |
| Acetone | 100 |

Instead of using acetone alone as the solvent the following solvent may be used:

| | Parts |
|---|---|
| Acetone | 50 |
| Benzene | 25 |
| Alcohol | 25 |
| Ethyl lactate | 20 |

Example V

The following is an illustration of a coating composition containing the aniline furfural resin and a natural resin.

| | Parts |
|---|---|
| Cellulose acetate | 10 |
| Aniline furfural resin | 10 |
| Natural resin, e. g. manila | 5 |
| Acetone | 40 |
| Ethyl acetate | 30 |
| Benzene | 10 |
| Diacetone alcohol | 10 |

To this may be added 5 parts of diethyl phthalate. If a colored lacquer is desired, 5 to 10 parts of pigment and/or 1 to 5 parts of dye may be added.

Example VI

Another illustration of a lacquer that produces light-fast films is the following:

| | Parts |
|---|---|
| Cellulose acetate | 15 |
| Aniline furfural resin | 10 |
| Phenol formaldehyde resin | 5 |
| Ester gum | 5 |
| Diethyl phthalate | 10 |
| Triacetin | 5 |
| Pigment | 15 |
| Dye | 5 |
| Acetone | 150 |
| Benzene | 50 |
| Alcohol | 50 |
| Ethyl lactate | 20 |
| Diacetone alcohol | 20 |

Example VII

| | Parts |
|---|---|
| Cellulose acetate | 10 |
| Phenol furfural resin | 5 |
| Furfural aniline resin | 5 |
| Acetone | 100 |
| Diacetone alcohol | 20 |

In the above examples, the cellulose acetate may be of any of the various types, high or low viscosity, acetone or chloroform soluble, and may be replaced in part, or wholly, by other cellulosic derivatives such as the propionate, butyrate, etc.

The term phenol is, in the references to phenol formaldehyde resins, to be understood to include, besides hydroxybenzol ($C_6H_5OH$), all homologues and also polyphenols such as resorcin and the like and the naphthals and their derivatives with a free hydroxyl group. Also compounds having free hydroxyl groups such as methylene diphenol $CH_2(C_6H_4OH)_2$, diphenylol propane $(CH_3)_2C(C_6H_4OH)_2$, and similar compounds in which the phenyl group is replaced by the naphthyl group may be used to prepare the resin.

It is to be understood that the foregoing details are given merely by way of illustration and that many variations may be made therein without departing from the spirit of this invention.

Having described our invention what we claim and desire to secure by Letters Patent is:

1. A coating composition comprising an organic derivative of cellulose, an aromatic amine-furfural resin which bleaches on exposure to light, a phenol-aldehyde resin which darkens on exposure to light and a common solvent, the proportions of resins present being such as to produce films that maintain their color unchanged on exposure to light.

2. A coating composition comprising cellulose acetate, an aromatic amine-furfural resin which bleaches on exposure to light, a phenol-aldehyde resin which darkens on exposure to light and a common solvent, the proportions of resins present being such as to produce films that maintain their color unchanged on exposure to light.

3. A coating composition comprising an organic derivative of cellulose, an aniline-furfural resin which bleaches on exposure to light, a phenol-aldehyde resin which darkens on exposure to light and a common solvent, the proportions of resins present being such as to produce films that maintain their color unchanged on exposure to light.

In testimony whereof, we have hereunto subscribed our names.

WILLIAM H. MOSS.
BLANCHE B. WHITE.